United States Patent [19]

Jackson

[11] Patent Number: 5,241,566
[45] Date of Patent: Aug. 31, 1993

[54] FULL DUPLEX FSK SYSTEM

[75] Inventor: Charles R. Jackson, St. Petersburg, Fla.

[73] Assignee: E-Systems, Inc., Dallas, Tex.

[21] Appl. No.: 283,854

[22] Filed: Dec. 13, 1988

[51] Int. Cl.$^5$ .............................................. H04L 27/10
[52] U.S. Cl. ........................................ 375/62; 375/45; 375/88; 375/91; 329/300; 332/100
[58] Field of Search .................... 375/62, 61, 65, 88, 375/91, 9, 45; 329/300, 302; 332/100; 370/24

[56] References Cited

U.S. PATENT DOCUMENTS

| | | | |
|---|---|---|---|
| 4,499,585 | 2/1985 | Mosley et al. | 375/62 |
| 4,618,966 | 10/1986 | Stepp et al. | 375/62 |
| 4,625,319 | 11/1986 | Krawitz | 375/61 |
| 4,672,636 | 6/1987 | Marshall et al. | 375/88 |
| 4,745,627 | 5/1988 | Gubser | 375/88 |
| 4,752,742 | 6/1988 | Akaiwa | 375/88 X |

Primary Examiner—Curtis Kuntz
Assistant Examiner—Young Tse
Attorney, Agent, or Firm—Harold E. Meier

[57] ABSTRACT

A frequency agile homodyne full duplex FSK system having a receiver section using an image-cancellation mixer wherein sum and difference signals generated by a pair of double-balanced mixers are added together with proper phase to cancel out the image response normally associated with heterodyne receivers and directly down-convert the carrier frequency to the baseband frequency. The transmitter section of the FSK system consists of an FSK modulator whose peak deviation is controlled by an active derivative of a crystal clock. The FSK modulator functions in the manner of a phasing single sideband (SSB) mixer with upper or lower sideband signals generated by the proper phasing of quadrature components of the carrier frequency and the peak deviation signal derived from a crystal clock.

29 Claims, 2 Drawing Sheets

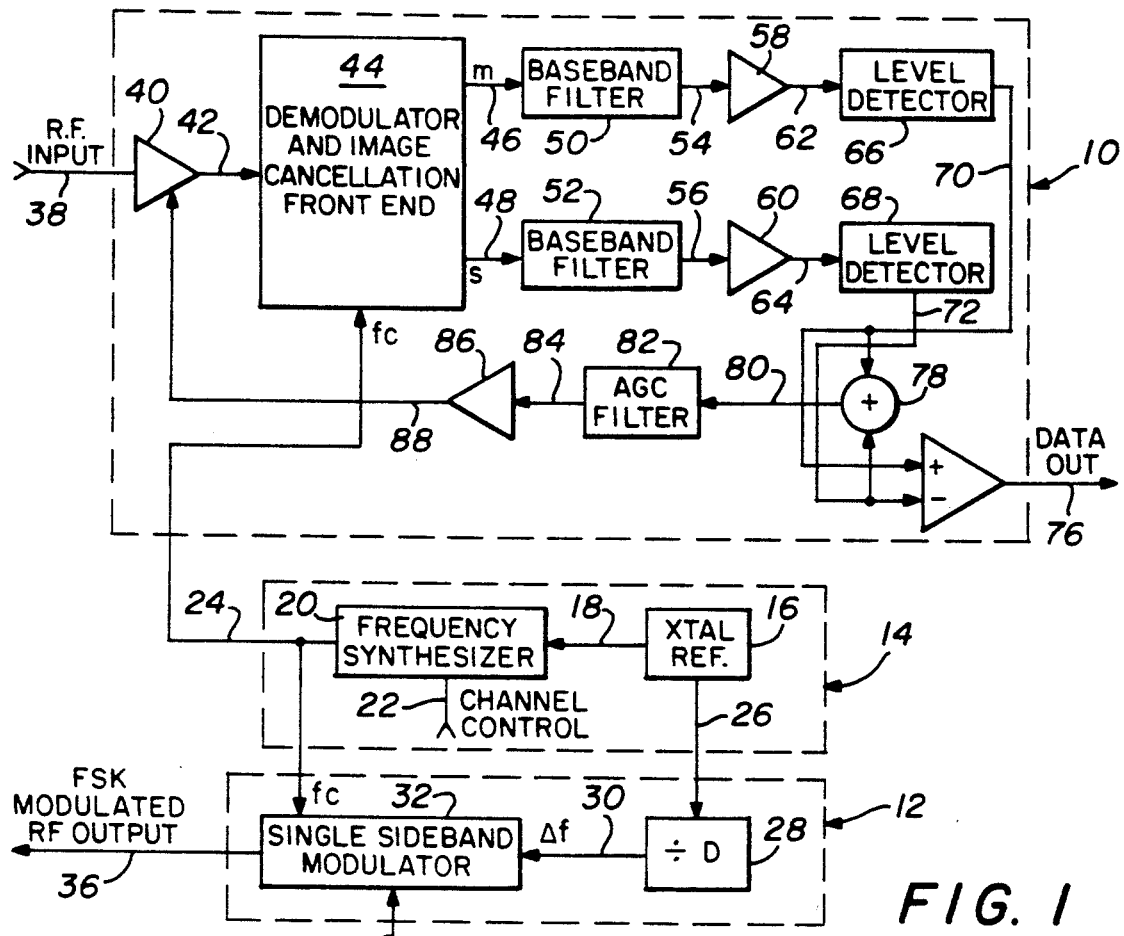
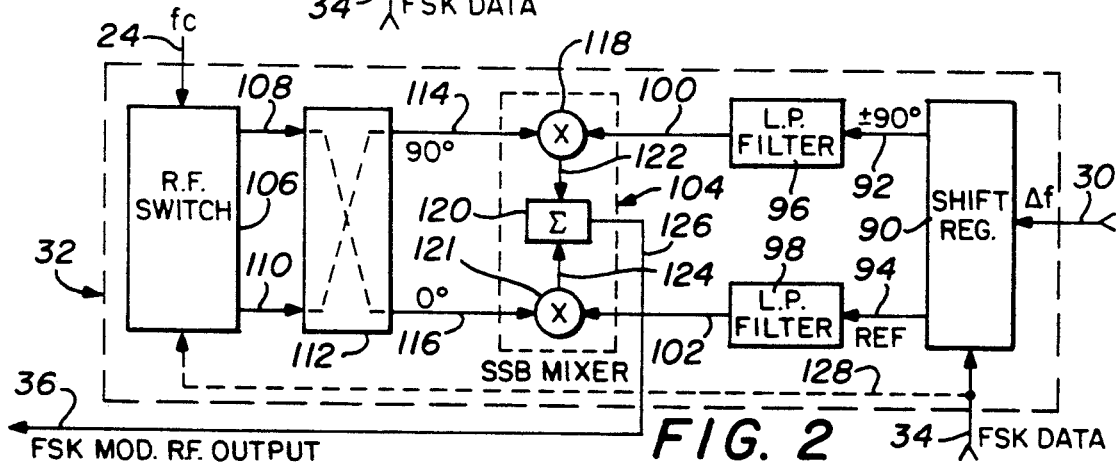
FIG. 1
FIG. 2
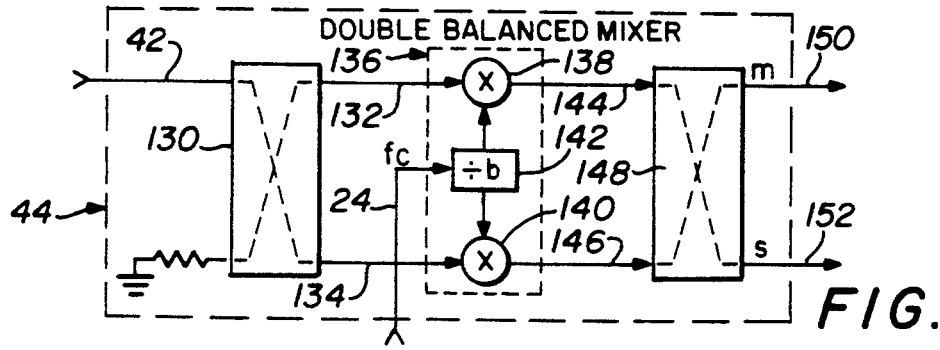
FIG. 3

FULL DUPLEX FSK SYSTEM

BACKGROUND OF THE INVENTION

FSK transmitters and receivers in combination to form a modem for receiving and transmitting FSK signals are well known in the art. However, in these prior art systems, the majority of the receiver gain is at R.F. or I.F. frequencies where costly multipoled crystal filters must be used and in addition, tracking R.F. narrowband tuned bandpass filters are required to attenuate spurious noise generated in mixers. In addition, mark and space channel amplifiers must be accurately gain and phase-matched. Very accurate frequencies must be generated by crystal or SAW devices in order to provide proper receiver selectivity. Because mixers are used to generate I.F. and lower frequencies, spurious responses are generated which requires the need for complex R.F. filtering. In a like manner, in the modulator-transmitter, modulation at intermediate frequencies requires translation mixers and tuned R.F. filters which are required to attenuate spurious noise generated by the mixers.

The present invention overcomes the disadvantages of the prior art by providing a full duplex FSK system in which the modulator and demodulator are extremely broadband. Center frequency operation is controlled by a synthesizer injection frequency. Further, a single frequency synthesizer provides the R.F. signals required for both receiver and transmitter functions. Translation of the frequency-shift-keying R.F. spectrum directly to baseband in the receiver drastically reduces hardware complexity without sacrificing performance. Thus, the majority of the receiver gain can be at baseband where gain elements are high performance and relatively simplistic and inexpensive. DC response is not required and mark/space channel amplifiers do not have to be accurately gain and phase-matched. Receiver selectivity is provided by baseband L/C components or active filters. Crystal or SAW devices are not required. Adequate receiver dynamic range is achieved by the use of automatic gain control. The level detectors and differential output stage have an additional 30 dB linear range. Because receiver signals are converted to baseband (with no intermediate frequency) many spurious responses are eliminated. This reduces the need for complex R.F. filtering. The receiver section also uses an image-cancellation mixer wherein sum and difference signals generated by a pair of double-balanced mixers are added together with proper phase to cancel out the image response normally associated with heterodyne receivers.

The transmitter section of the FSK system includes an FSK modulator whose peak deviation is controlled by an accurate derivative of a crystal clock. The FSK modulator functions in the manner of a phasing single sideband mixer where upper or lower sideband signals are generated by the proper phasing of quadrature components of the carrier frequency and the peak deviation signal derived from the crystal clock. Again, translation of the frequency-shift-keying R.F. spectrum directly from baseband drastically reduces hardware complexities without sacrificing performance. Such translation directly at final frequency eliminates translation mixers and the tuned R.F. filters required to attenuate spurious noise generated by mixers.

Thus, the present invention provides a full duplex FSK receiving and transmitting system.

The invention also provides a full duplex FSK receiving and transmitting system in which the receiver section of the system uses an image-cancellation mixer to cancel out the image response normally associated with heterodyned receivers.

The present invention provides a full duplex FSK receiving and transmitting system in which translation of the frequency-shift-keying R.F. spectrum is accomplished directly to and from baseband frequency.

The invention additionally provides a full duplex FSK receiving and transmitting system in which the modulator in the transmitter is similar to a phasing single sideband mixer where upper or lower sideband signals are generated by the proper phasing of quadrature components of the center frequency and the deviation frequency signals.

The invention also provides an FSK system in which the majority of the receiver gain can be at baseband where gain elements are high performance and relatively simplistic and inexpensive.

Also in accordance with the present invention, there is provided an FSK system in which the receiver signals are converted directly to baseband without any intermediate frequency, thus, eliminating spurious responses and the need for complex R.F. filtering.

The present invention also provides an FSK system wherein modulation takes place directly at final frequency to eliminate the translation mixers and tuned R.F. filters required to attenuate spurious noise generated by mixers.

SUMMARY OF THE INVENTION

Accordingly, the invention provides a wideband single sideband FSK transmitter comprising a clock for providing a desired R.F. carrier frequency, $f_c$, and a peak deviation frequency, $\Delta f$, means for generating FSK data representing a mark or a space state and a single sideband modulator coupled to the clock and the FSK data generating means for generating a single sideband output R.F. carrier signal, $f_c$, having a peak deviation frequency of $\Delta f$ and modulated with the FSK data.

It is also an object of the invention to provide a wideband single sideband FSK receiver comprising an input R.F. amplifier for receiving and amplifying a single sideband carrier signal, $f_c$, FSK-modulated with mark and space data and generating an output, a local oscillator for generating a frequency, $f_c$, a demodulator for receiving the output of the R.F. amplifier and recovering the FSK data representing the mark or the space signal at the baseband frequency, an image cancellation mixer coupled to the demodulator for receiving the baseband frequency and cancelling any image response that may be associated with the mark or space, and means coupled to the image cancellation mixer for recovering the FSK data represented by the mark or space signal.

The invention also relates to a full duplex FSK transmitting and receiving system comprising a single frequency synthesizer for generating the R.F. carrier signals having a center frequency, $f_c$, required for both the transmitter and the receiver, a transmitter having a modulator for frequency-shift-keying a single sideband R.F. carrier directly with mark and space baseband data, and a receiver for translating an input FSK modulated carrier directly to baseband for recovering a mark and space data from the baseband frequency.

BRIEF DESCRIPTION OF THE DRAWINGS

For a more complete understanding of the present invention and the advantages thereof, reference is now made to the following description taken in conjunction with the accompanying drawings.

Referring to the drawings:

FIG. 1 is a schematic block diagram of the novel FSK transmitting and receiving system;

FIG. 2 is a schematic block diagram of the single sideband modulator illustrated in the transmitter of FIG. 1;

FIG. 3 is a schematic block diagram of the demodulator and image cancellation circuit illustrated in the receiver in FIG. 1;

DETAILED DESCRIPTION OF THE DRAWINGS

Figure 4:
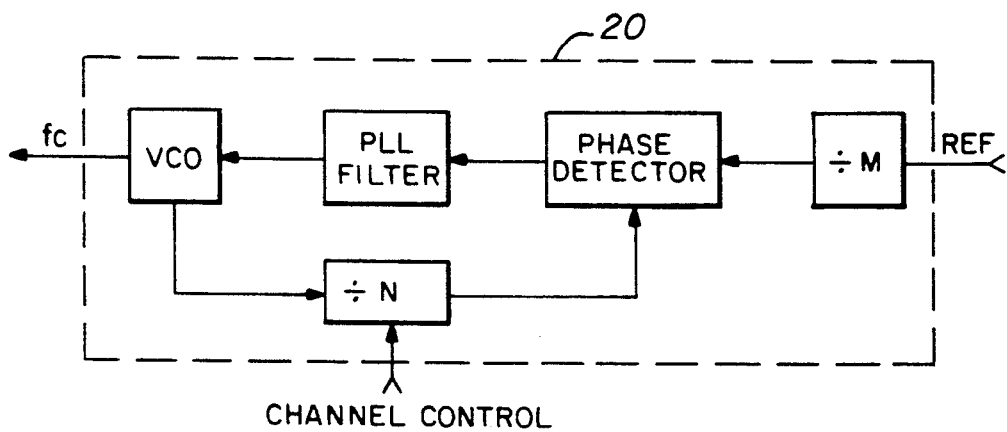
FIG. 4 is a schematic block diagram of the frequency synthesizer in the clock circuit of FIG. 1.

FIG. 1 is a schematic block diagram of the novel FSK receiving and transmitting system and includes a receiver 10, a transmitter 12 and a clock circuit 14. Clock circuit 14 is driven by a crystal reference source 16 which generates a clock signal on line 18 that is coupled to a frequency synthesizer 20. FIG. 4 illustrates a typical frequency synthesizer. The frequency synthesizer 20 has a channel control input 22 which influences a divider circuit and causes the frequency synthesizer 20 to generate any desired frequency on line 24. The signal on line 24 is the center frequency which is used in common by both the receiver 10 and the transmitter 12 in an $f_1/f_1$ system. For an $f_1$, $f_2$ duplex system, a separate synthesizer for the transmitter would have to be used to provide the programmable R.F. center frequency, $f_c$, signal.

The crystal reference 16 also has an output on line 26 which is coupled to a divider circuit 28 in the transmitter 12. The divider circuit 28 is so adjusted as to produce a desired deviation signal, $\Delta f$, on line 30 for modulating the R.F. carrier, $f_c$. Thus, the single sideband modulator 32 receives the center frequency R.F. carrier on line 24, the deviation frequency, $\Delta f$, on line 30, and the FSK data on line 34 and generates an FSK-modulated output signal on line 36 which is transmitted. Thus, the single sideband modulator 32 FSK modulates the R.F. spectrum directly from baseband with the deviation frequency $\Delta f$.

The receiver 10 receives the FSK-modulated R.F. signal on input line 38 where it is coupled to amplifier 40. This signal is then amplified and coupled on line 42 to a demodulator and image cancellation circuit 44. Circuit 44 translates the frequency-shift-key portion of the R.F. spectrum directly to baseband, generates sum and difference signals with mixers and a local oscillator, and adds together the sum and difference signals with proper phase to cancel out image response normally associated with heterodyned receivers. The output signals from demodulator and image cancellation circuit 44 is on two channels. The first is a mark channel 46 and the second is a space channel 48. Each of these signals on lines 46 and 48 is coupled to a respective baseband filter 50 and 52 to reject adjacent channel frequencies. The output of the two filter circuits on lines 54 and 56, respectively, are coupled to amplifiers 58 and 60, respectively, where the filtered signals are amplified. The output of the amplifiers 58 and 60 on lines 62 and 64, respectively, are coupled to level detectors 66 and 68 which produce outputs on lines 70 and 72 respectively that are coupled to differential comparator amplifier 74. The level detectors 66 and 68 and differential amplifier 74 have approximately 30 dB of dynamic range. The recovered FSK data is produced by differential amplifier 74 on line 76 as an output level (logic "1" or a logic "0") based on a decision as to whether the mark or space signal is greater. An AGC system is provided comprising the summing unit 78 which receives the signals on lines 70 and 72 from the level detectors 66 and 68, generates an output on line 80 which is coupled to an AGC filter 82 and the output signal on line 84 is amplified by the AGC amplifier 86 and coupled on line 88 back to the input amplifier 40 and provides additional dynamic range by attenuating strong signals in the gain-controlled amplifier 40.

Thus, both the receiver 10 and the transmitter 12 utilize a novel feature of translation of the frequency-shift-keying R.F. spectrum directly to and from baseband. This concept is important because it drastically reduces hardware complexities without sacrificing performance. In addition, the transmitter 12 utilizes a modulator similar to a phasing single sideband mixer where upper or lower sideband signals are generated by the proper phasing of quadrature components of the center frequency, $f_c$, and deviation frequency, $\Delta f$ signals. Further, the receiver 10 utilizes an image cancellation mixer which is well known in the art and which utilizes two doubly-balanced mixers driven with quadrature components of the input R.F. signal. The center frequency, $f_c$, from the local oscillator is mixed with the quadrature components and sum and difference signals generated by the mixers are added together with proper phase to cancel out the image response normally associated with heterodyned receivers. This will be explained in more detail in relation to FIG. 3.

FIG. 2 is a schematic block diagram of the single sideband modulator 32 in transmitter 12 as shown in FIG. 1. The center frequency, $f_c$, on line 24, is provided by the frequency synthesizer 14 in FIG. 1. The peak deviation signal, f, which is derived from the crystal 16 in the clock circuit 14 and is further reduced in frequency by divider 28 in transmitter 12 as shown in FIG. 1, is input to the single sideband modulator on line 30. The FSK data is input on line 34 and is processed by a "shift-right, shift-left" TTL logic shift register 90. For wideband FM systems, those systems having a modululation index much greater than 1, the FSK data is applied to a terminal of shift register 90, the "shift-right, shift-left" TTL register which results in a phase reversal of 180° in the quadrature components. Thus, if the FSK data on line 34=1, the shift register 90 output on line 92= −90° and if the FSK data input on 34=0, the output of the shift register 90 on line 92 is +90°. A reference signal is generated from the shift register 90 on line 94. Because the deviation frequency, $\Delta f$, is at baseband, the lowpass filters 96 and 98 may be simple L/C lowpass or active filters. They do not have to be costly multipoled crystal filters which are used where the frequencies being considered are intermediate frequencies. The output of the filters 96 and 98 on line 100 and 102 are coupled to a single sideband mixer 104.

Figure 6:
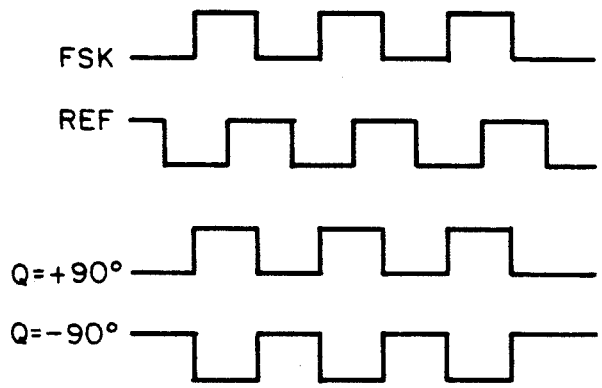
FIG. 6 is a diagram of the wave forms present at the Transistor Transistor Logic shift register in the transmitter of FIG. 2 illustrating the input FSK data and the output reference and quadrature signals.

The center frequency, $f_c$, on line 24 is coupled through an R.F. switch 106 which generates an output on lines 108 and 110, both of which are coupled to a 90° phase splitter 112. Phase splitter 112 generates quadrature signals on lines 114 and 116 which are coupled to the single sideband mixer 104. As indicated earlier, the FSK data applied on input line 34 to shift register 90 results in a phase reversal of 180° and the quadrature component signals on line 92. Thus, as shown in FIG. 6, when the FSK input signal is positive, $Q = +90°$ and when the FSK signal is negative, $Q = -90°$. The Q signals on line 100 are coupled to mixer 118 along with the 90° signal on line 114 from the 90° phase splitter 112 where they are mixed. The result is coupled to summing unit 120 on line 122. In a like manner, the reference signal on line 102 is coupled to mixer 121 along with the 0° signal from 90° phase splitter 112 where they are mixed and the results are coupled to summing unit 120 on line 124. The output of summing unit 120 on line 126 is the FSK-modulated R.F. output. Thus, the modulator 12 includes the single sideband mixer which is similar to a phasing single sideband mixer where the upper or lower sideband signals are generated by the proper phasing of quadrature components of the center frequency, $f_c$, and the deviation frequency, $\Delta f$, signals. If the deviation frequency signals, $\Delta f$, on line 30 have their phase reversed to the shift register 90, the mixer 104 causes an output shift from the lower sideband to the upper sideband.

If it is desired to provide a modulation capability for an FSK system with any modulation index, then the FSK data on line 34 is coupled on the dashed line 128 to the R.F. switch 106 rather than to the shift register 90. In such case, the reference signals on line 94 and the quadrature signal on line 92 remain fixed. The FSK data on line 128 then causes R.F. switch 106 to be toggled to direct the center frequency input, $f_c$, to either the 90° port or the 0° port of the single sideband mixer 104 depending upon whether the FSK data is a "1" or a "0." In that case, either upper or lower sideband generation results and the system works as indicated previously. Thus, any modulation index can be used with the system if the R.F. switch 106 is toggled with the FSK data. By coupling the FSK data on line 34 to the shift register 90, the system is somewhat easier to implement inasmuch as the shift register 90 is configured with standard Transistor Transistor Logic (TTL) rather than R.F. switching networks.

FIG. 3 is a schematic block diagram of the demodulator and image cancellation circuit 44 shown in the receiver unit 10 in FIG. 1. The FSK-modulated R.F. signal is input on line 42 from the amplifier 40 in FIG. 1. This signal is coupled to a 90° phase splitter 130 which produces quadrature output signals on lines 132 and 134 which are coupled to double-balanced mixer 136. Double-balanced mixer 136 has a first mixer 138 for receiving one of the quadrature signals on line 132 and a second mixer 140 for receiving the other quadrature signal on line 134 from the 90° phase splitter 130. In addition, divider network 142 receives the carrier signal, $f_c$ and couples it directly to mixers 138 and 140 where it is mixed with the incoming quadrature signals. The output of the double-balanced mixer 136 on lines 144 and 146 are the sum and difference baseband signals generated by mixers 138 and 140 and represent the mark and space signals of the FSK data. These signals are coupled to a second phase splitter 148 where they are added together with proper phase to cancel out the image response normally associated with heterodyned receivers. The output of the phase splitter 148 on lines 150 and 152 represent the FSK mark and space data. The phasing is such that the mark signals or energy is summed at the mark output terminal and cancelled at the space output terminal on line 152. In similar fashion, when a space has been transmitted, signal energy is summed at the space terminal on line 152 and cancelled at the mark terminal on line 150. The receiver is tuned to the proper R.F. channel by setting the injection frequency from the synthesizer on line 24 to the center frequency, $f_c$. Thus, receiver 10 translates the input FSK spectrum to a baseband network consisting of "mark" and "space" channels. The mark/space signals are filtered, amplified and level detected. A differential comparator generates an output level (logic "1" or logic "0") based on a decision as to whether the mark signal or space signal is greater. The double-balanced mixer 136 and quadrature phase splitter 148 form an image cancellation mixer circuit which is a well documented circuit in the prior art.

Figure 5:
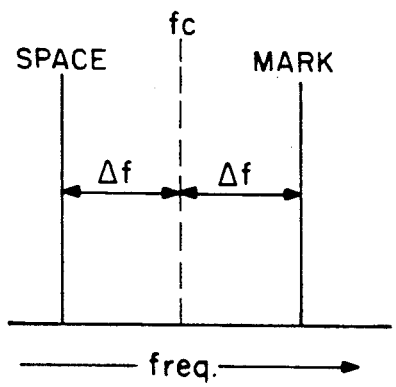
FIG. 5 is a plot of frequency versus amplitude illustrating the center frequency and the deviation frequency of the space and mark.

FIG. 5 illustrates the center frequency, $f_c$ and the space or mark deviation frequency, $\Delta f$, from the center frequency.

Figure 7:
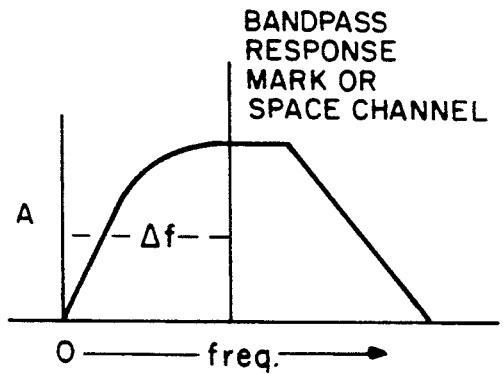
FIG. 7 is a plot of frequency versus amplitude illustrating the frequency response of the L/C baseband filters located in the mark and space channels.
Figure 8:
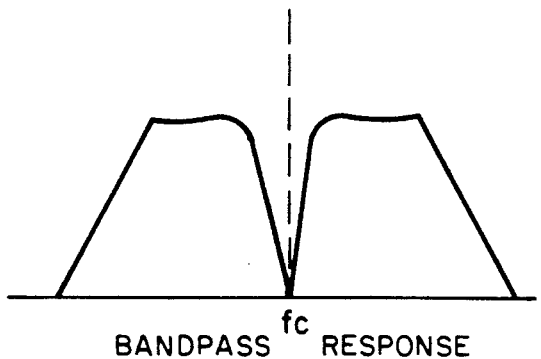
FIG. 8 is a plot of frequency versus amplitude for the bandpass filters.

FIG. 7 illustrates the amplitude versus frequency response in the mark or space channel of baseband filters 50 and 52 in the receiver. FIG. 8 illustrates the equivalent bandpass response at R.F. frequency.

Thus, there has been disclosed a unique full duplex FSK system in which translation of the frequency-shift-keying R.F. spectrum directly to and from baseband drastically reduces hardware complexity without sacrificing performance. In addition, the full duplex system receives and transmits on the same center frequency and operates over a broad frequency range, typically an octave or more. Programming the synthesizer to a new center frequency is the only "tuning" required. Receive and transmit sections share the same frequency synthesizer to reduce hardware complexities. The receiver uses a well known "image cancellation mixer" circuit in novel fashion to cancel out the image response normally associated with heterodyned receivers. The transmitter consists of an FSK modulator whose peak deviation at final frequency is controlled by an accurate derivative of the crystal clock. The modulator includes a phasing single sideband mixer where upper or lower sideband signals are generated by the proper phasing of quadrature components of the center frequency, $f_c$, and deviation frequency, $\Delta f$, signals.

The FSK data for modulation can be coupled either to a shift register for wideband FM systems with a modulation index much greater than one, to provide reference and + or −90° outputs or to an RF switch which is toggled by the FSK data for FSK systems with any modulation index. The FSK data applied to the shift register results in a phase reversal of 180° in the ±90° output signal. By reversing the phase of the deviation frequency, $\Delta f$, inputs to the shift register, an output shift can be made from lower sideband to upper sideband. In order to provide modulation capabilities for an FSK system with any modulation index, the FSK data toggles an R.F. switch which directs the center frequency, $f_c$, input to either a 0° or a 90° input port of a single sideband mixer, which results in either upper or lower sideband generation.

Thus, the modulator and demodulator are both extremely broadband. Center frequency operation is controlled by the synthesizer injection frequency. A single frequency synthesizer provides the R.F. signals required for both the receiver and transmitter functions. The majority of the receiver gain can be at baseband where gain elements are high performance and relatively simplistic and inexpensive. DC response is not required and mark/space channel amplifiers do not have to be accurately gain and phase matched. Receiver selectivity is provided by baseband L/C components or active filters. Crystal or SAW devices are not required. Adequate receiver dynamic range is achieved by the use of automatic-gain-control. The level detectors and differential output stage have an additional 30 dB linear range. Because receiver signals are converted directly to baseband (zero intermediate frequency), many spurious responses are eliminated. This reduces the need for complex R.F. filtering. Finally, FSK modulation directly at final frequency eliminates translation mixers and the tuned R.F. filters required to attenuate spurious mixer noise.

While the invention has been described in connection with a preferred embodiment, it is not intended to limit the scope of the invention to the particular form set forth, but on the contrary, it is intended to cover such alternatives, modifications and equivalence as may be included within the spirit and scope of the invention as defined in the appended claims.

I claim:

1. A wideband single sideband FSK transmitter comprising:
   a. a clock for providing a desired R.F. carrier frequency, $f_c$ and a peak deviation frequency, $\Delta f$
   b. means for generating baseband FSK data representing a mark or a space state, and
   c. a single sideband modulator coupled to the clock and the FSK data generating means for producing quadrature components of the carrier frequency, $f_c$, and the deviation frequency, $\Delta f$, and generating a single sideband output R.F. carrier signal, $f_c$, having a peak deviation frequency of $\Delta f$ and directly modulated with the baseband FSK data.

2. A single sideband FSK transmitter as in claim 1 wherein said modulator includes a single sideband mixer for receiving the peak deviation signal, $\Delta f$, and the R.F. carrier frequency, $f_c$, and generating upper or lower sideband FSK-modulated R.F. output signals by proper phasing of the quadrature components of the $f_c$ and $\Delta f$ signals.

3. A single sideband FSK transmitter as in claim 2 wherein the single sideband modulator further includes:
   a. means for receiving the peak deviation signal, $\Delta f$, and generating a $\Delta f$ reference signal and a $\Delta f$ quadrature signal shifted 90° with respect to the reference signal, and
   b. means in the reference signal generating means for receiving the FSK signal and causing a +90° phase-shifted $\Delta f$ quadrature output signal when the FSK signal represents one of the mark and space states and a −90° phase-shifted quadrature output signal when the FSK signal represents the other of the mark and space states.

4. A single sideband FSK transmitter as in claim 3 wherein the reference $\Delta f$ signal generating means is a shift-left, shift-right TTL logic circuit.

5. An FSK transmitter as in claim 4 wherein said single sideband mixer further comprises:
   a. a first mixer for receiving the ±90° phase-shifted $\Delta f$ signal and a quadrature component of the R.F. carrier frequency $f_c$, and generating a first FSK-modulated output signal,
   b. a second mixer for receiving the reference $\Delta f$ signal and the R.F. carrier frequency, $f_c$, and generating a second FSK-modulated output signal, and
   c. means coupled to the first and second mixers for summing the first and second FSK-modulated signals and producing a single sideband FSK-modulated R.F. carrier output signal, $f_c$, having a peak deviation frequency of $\Delta f$.

6. An FSK transmitter as in claim 5 wherein the ±90° phase-shifted $\Delta f$ signals determine which of the upper or lower sidebands is transmitted.

7. An FSK transmitter as in claim 2 wherein the single sideband modulator further includes:
   a. An R.F. switch for receiving the carrier frequency, $f_c$
   b. said R.F. switch including means for receiving the FSK data and generating a first quadrature carrier frequency output signal, $f_c$, when the FSK data represents a mark and a second quadrature carrier frequency output signal, when the FSK data represents a space;
   c. means for receiving the peak deviation signal $\Delta f$, and generating a $\Delta f$ reference component signal and $\Delta f$ quadrature component signal shifted 90° with respect to the reference component signal;
   d. said single sideband mixer having first and second quadrature ports for respectively receiving one of the first and second quadrature signals, $f_c$ and a third and fourth ports for respectively receiving one of the quadrature components of the deviation frequency, $\Delta f$, said single sideband mixer generating upper or lower sideband FSK-modulated R.F. output signals in accordance with the first and second quadrature signals generated by the means for receiving the FSK data.

8. An FSK transmitter as in claim 7 further comprising:
   a. said first quadrature port of said single sideband mixer comprising a first mixer having 0° ports for receiving the first quadrature carrier frequency, $f_c$, and the reference component of the deviation frequency, $\Delta f$, and generating a first FSK-modulated output signal,
   b. said second quadrature port of said single sideband mixer comprising a second mixer having 90° ports for receiving the second quadrature carrier frequency, $f_c$, and the quadrature component of the deviation frequency, $\Delta f$, and generating a second FSK-modulated output signal, and
   c. means coupled to the first and second mixers for summing the first and second FSK-modulated output signals and producing a single sideband FSK-modulated R.F. carrier signal, $f_c$, having a peak deviation frequency of $\Delta f$.

9. A wideband single sideband FSK receiver comprising:
   a. an input R.F. amplifier for receiving and amplifying a single sideband carrier signal, $f_c$, FSK-modulated with baseband mark and space data and generating an output, b. a local oscillator for generating a signal output at a frequency substantially equal to the frequency of the carrier signal, $f_c$, c. a demodulator for receiving the output of the R.F. amplifier and the output of the local oscillator, and recovering the FSK data representing the baseband mark and space data directly at baseband frequency, said demodulator comprising:

a phase splitter for receiving said FSK-modulated carrier, $f_c$, and generating quadrature component signals, a first balanced mixer receiving a respective one of the quadrature component signals and the local oscillator output generating a first demodulated output signal at baseband frequency, a second balanced mixer receiving a respective one of the quadrature component signals and the local oscillator output generating a second demodulated output signal at baseband frequency, and a second phase splitter having separate output channels and input channels coupled to the balanced mixers for receiving the first and second demodulated output signals and adding the first and second signals phase adjusted to minimize any adverse image response and generate baseband mark and space data signals at baseband frequency on separate output channels, and d. means coupled to the demodulator for recovering signals representing the baseband mark and space data.

10. A receiver as in claim 9 wherein said means for recovering comprises;

a. first and second baseband filters individually coupled to a separate output channel from the second phase splitter for filtering the modulation data to reject adjacent channel signals, b. first and second amplifiers individually coupled to the output of one of the baseband filters for amplifying the mark and space data signals, c. first and second level detectors individually coupled to the output of one of the amplifiers, and d. a differential amplifier for receiving the outputs of each level detector and generating data representing the FSK mark and space modulation data.

11. A receiver as in claim 10 further including:

a. a summing circuit coupled to the outputs of the first and second level detectors, b. an AGC filter coupled to the output of the summing circuit and generating an output signal, and c. an AGC amplifier coupled to the AGC filter for amplifying the output signal of the AGC filter for use by the input R.F. amplifier to control signal gain.

12. A full duplex FSK transmitting and receiving system comprising:

a. a clock circuit including a single frequency synthesizer for generating an R.F. carrier signal having a center frequency, $f_c$, for both the transmitter and the receiver, b. a transmitter having a modulator for frequency-shift-keying the R.F. carrier with mark and space data directly at baseband frequency, said modulator comprising:

means for generating FSK data representing a mark or a space state, and a single sideband modulator coupled to said clock circuit and the FSK data generating means for generating a single sideband output R.F. carrier signal, $f_c$, having a peak deviation frequency of $\Delta F$ and modulated with the baseband frequency FSK data, and c. a receiver for translating an input FSK-modulated carrier directly to baseband frequency for recovering the mark and space data.

13. A system as in claim 12 wherein said single sideband modulator comprises a single sideband mixer for receiving the peak deviation signal, $\Delta f$, and the R.F. carrier frequency, $f_c$, and generating upper or lower sideband FSK-modulated R.F. output signals by proper phasing of quadrature components of the $f_c$ and $\Delta f$ signals.

14. A system as in claim 13 wherein the single sideband mixer comprises:

a. means for receiving the peak deviation signal, $\Delta f$, and the FSK modulation signals and generating a reference $\Delta f$ signal, and b. means for receiving the FSK signal and to cause the quadrature $\Delta f$ signal to be a $+90°$ phase-shifted $\Delta f$ output signal when the FSK signal represents one of the mark and space states and a $-90°$ phase-shifted output signal when the FSK signal represents the other of the mark and space states.

15. A system as in claim 14 wherein the means for generating the quadrature and reference $\Delta f$ signal comprises a shift-left, shift-right TTL logic circuit.

16. A system as in claim 15 wherein said single sideband mixer further comprises:

a. a first mixer for receiving the $\pm 90°$ phase-shifted $\Delta f$ signal and the R.F. carrier frequency, $f_c$, and generating a first FSK-modulated output signal, b. a second mixer for receiving the reference $\Delta f$ signal and the R.F. carrier frequency $f_c$, and generating a second FSK-modulated output signal, and c. means coupled to the first and second mixers for summing the first and second FSK-modulated signals and producing a single sideband FSK-modulated R.F. carrier output signal, $f_c$, having a peak deviation frequency of $\Delta f$.

17. A system as in claim 16 wherein the $\pm 90°$ phase-shifted $\Delta f$ signals determine which of the upper or lower sidebands is transmitted.

18. A system as in claim 13 wherein the single sideband modulator further includes:

a. an R.F. switch for receiving the carrier frequency, $f_c$, b. said R.F. switch receiving the FSK data and generating a first quadrature carrier frequency output signal, $f_c$, when the FSK data represents a mark and a second quadrature carrier frequency output signal, $f_c$, when the FSK data represents a space, and c. means for receiving the peak deviation frequency, $\Delta f$, and generating a $\Delta f$ reference component and a quadrature component shifted 90° with respect to the reference component; and wherein said single sideband mixer includes first and second ports for receiving one of the first and second quadrature signals, $f_c$, and third and fourth ports receiving respective ones of the quadrature components of the deviation frequency, $\Delta f$, said single sideband mixer generating upper or lower sideband FSK-modulated R.F. output signals in accordance with the quadrature $f_c$ signal received by the first or second ports.

19. A system as in claim 18 wherein said single sideband mixer further comprises:
   a. a first mixer having 0° ports for receiving the first quadrature carrier frequency, $f_c$, and the reference component of the deviation frequency, $\Delta f$, and generating a first FSK-modulated output signal,
   b. a second mixer having 90° ports for receiving the second quadrature carrier frequency, $f_c$, and the quadrature component of the deviation frequency, $\Delta f$, and generating a second FSK-modulated output signal, and
   c. means coupled to the first and second mixers for summing the first and second FSK-modulated output signals and producing a single sideband FSK-modulated R.F. carrier output signal, $f_c$, having a peak deviation frequency of $\Delta f$.

20. A full duplex FSK transmitting and receiving system as in claim 12 wherein the receiver for translating the input carrier directly to baseband frequency further comprises:
   a. an input R.F. amplifier for receiving and amplifying a single sideband carrier signal, $f_c$ FSK-modulated with baseband mark and space data and generating an output,
   b. a demodulator and image cancellation circuit receiving the output of the R.F. amplifier and the synthesizer frequency, and recovering the FSK data representing the baseband mark and space signal at the baseband frequency, said demodulator comprising:
   means for receiving the output of the R.F. amplifier and generating quadrature component signals,
   a double balanced mixer receiving the quadrature component signals and the carrier signal at center frequency, and generating a demodulated output signal at baseband frequency, and
   means for receiving the demodulated output signals from said double balanced mixer for generating baseband mark and space data signals at baseband frequency on separate output channels.

21. The system as in claim 20 wherein said receiver further comprises:
   a. first and second baseband filters individually coupled to a separate output channel from the means for receiving for filtering the modulation data to reject adjacent channel signals,
   b. first and second amplifiers individually coupled to the output of one of the baseband filters for amplifying the mark and space data signals,
   c. first and second level detectors individually coupled to the output of one of the amplifiers, and
   d. a differential amplifier for receiving the outputs of each level detector and generating data representing the FSK mark and space modulation data.

22. A receiver as in claim 21 further including:
   a. a summing circuit coupled to the output from each level detector,
   b. an AGC filter coupled to the output of the summing circuit and generating an output signal, and
   c. an AGC amplifier coupled to the AGC filter for amplifying the output signal of the AGC filter for use by the input R.F. amplifier to control signal gain.

23. A method of generating a single sideband FSK-modulated output R.F. carrier signal comprising the steps of:
   a. generating a desired R.F. carrier frequency, $f_c$, and a baseband peak deviation frequency, $\Delta f$
   b. generating baseband FSK data representing a mark or a space state, and
   c. directly modulating quadrature components of the R.F. carrier frequency, $f_c$, with quadrature components of the baseband deviation frequency, $\Delta f$, and generating the single sideband output R.F. carrier, $f_c$, having a peak deviation frequency of $\Delta f$.

24. A method as in claim 23 wherein the step of directly modulating the R.F. carrier frequency further comprises the steps of:
   a. mixing the generated quadrature components of the baseband peak deviation signal, $\Delta f$, and the R.F. carrier frequency, $f_c$, with a single sideband mixer, and
   b. generating upper or lower sideband FSK-modulated signals with said mixer by proper phasing of the quadrature components of the $f_c$, and $\Delta f$, signals.

25. A method of recovering FSK data from a single sideband R.F. carrier signal, $f_c$, FSK modulated with baseband mark and space data comprising the steps of:
   a. amplifying the single sideband R.F. carrier signal, $f_c$, FSK-modulated with the baseband mark and space data,
   b. generating a local oscillator frequency of $f_c$,
   c. generating quadrature component signals from the amplified FSK-modulated single sideband R.F. carrier signal, $f_c$,
   d. double-balanced mixing each of the quadrature components and the local oscillator frequency, $f_c$,
   e. generating a demodulated signal at baseband frequency in response to the double-balanced mixing of the quadrature components, the demodulated signal having a sum and a difference signal,
   f. adding the sum and difference signals phase adjusted to minimize image response and generate the baseband mark and space data signals at baseband frequency on separate channels, and
   g. recovering the FSK data represented by the generated baseband mark and space data signals in each channel.

26. A method of providing a full duplex FSK transmitting and receiving system comprising the steps of:
   a. generating a R.F. carrier signal having a center frequency, $f_c$, for both a transmitter and a receiver by a common center frequency synthesizer,
   b. frequency-shift-keying the R.F. carrier signal, said frequency-shift-keying comprising the steps of:
   generating a baseband frequency FSK data signal representing a mark or space state, and
   modulating the R.F. carrier signal with the baseband frequency FSK data to generate a single sideband output R.F. carrier signal, $f_c$, having a peak deviation frequency of $\Delta f$, and
   c. translating an input FSK-modulated carrier directly to baseband frequency in a receiver for recovering the mark and space data.

27. A wideband single sideband FSK transmitter comprising:
   a clock means for providing a desired R.F. carrier frequency signal, $f_c$, and a peak deviation frequency signal, $\Delta f$;
   means for generating a baseband FSK data signal representing a baseband mark of a space state;
   means for generating quadrature components of the R.F. carrier frequency signal $f_c$;
   means for generating quadrature components of the deviation frequency signal $\Delta f$ from the FSK baseband signal wherein the quadrature components comprise a deviation frequency $\Delta f$ reference signal and a 90° shifted deviation frequency $\Delta f$ signal such that there is a +90° phase shift for a first baseband mark or space state and a −90° phase shift for a second baseband mark or space state in the shifted deviation frequency $\Delta f$ signal;

a single sideband modulator for receiving the quadrature R.F. carrier frequency signals, $f_c$ and the shifted and reference deviation frequency $\Delta f$ signals and generating direct FSK modulated R.F. single sideband output.

28. An FSK transmitter as in claim 27 wherein: said single sideband modulator comprises:

a first mixer for receiving the ±90° phase-shifted deviation frequency $\Delta f$ signal and a first quadrature component of the R.F. carrier frequency signal, $f_c$, and generating a first FSK-modulated signal, a second mixer for receiving the deviation frequency $\Delta f$ reference signal and a second quadrature component of the R.F. carrier frequency signal, $f_c$, and generating a second FSK-modulated signal, and further comprising:

means coupled to the first and second mixers for summing the first and second FSK-modulated signals and generating a single sideband FSK-modulated R.F. carrier output signal at a carrier frequency $f_c$ having a peak deviation frequency of $\Delta f$.

29. A method of generating a single sideband FSK-modulated output R.F. carrier signal comprising the steps of:

generating an R.F. carrier signal at a frequency $f_c$;

generating a peak deviation signal deviating by a frequency $\Delta f$ from the R.F. carrier signal;

generating baseband FSK data representing a mark or a space state;

shifting the deviation frequency $\Delta f$ signal ±90° according to the mark or space state of the FSK baseband data to generate quadrature deviation frequency $\Delta f$ signal components;

shifting the R.F. carrier frequency $f_c$ signal to generate quadrature carrier frequency $f_c$ components;

mixing a fist quadrature deviation frequency $\Delta f$ signal component with a first quadrature carrier frequency $f_c$ component to generate a first FSK-modulated signal;

mixing a second quadrature deviation frequency $\Delta f$ signal component with a second quadrature carrier frequency $f_c$ component to generate a second FSK-modulated signal; and adding the first and second FSK-modulated output signals to output a direct FSK modulated R.F. carrier signal.

* * * * *